United States Patent
Chen et al.

(10) Patent No.: US 8,598,298 B2
(45) Date of Patent: Dec. 3, 2013

(54) FLAME RETARDANT THERMOPLASTIC ELASTOMER COMPOSITION WITH RESISTANCE TO SCRATCH-WHITENING

(75) Inventors: Given Jing Chen, Shanghai (CN); Fangming Tony Gu, Shanghai (CN); Yurong Cao, Shanghai (CN); David H. Guo, Shanghai (CN); Xiaoxiong Shawn Miao, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/637,589

(22) PCT Filed: Mar. 26, 2010

(86) PCT No.: PCT/CN2010/071336
§ 371 (c)(1),
(2), (4) Date: Sep. 26, 2012

(87) PCT Pub. No.: WO2011/116525
PCT Pub. Date: Sep. 29, 2011

(65) Prior Publication Data
US 2013/0030093 A1    Jan. 31, 2013

(51) Int. Cl.
*C08K 5/34* (2006.01)
*C08K 5/10* (2006.01)

(52) U.S. Cl.
USPC ............................ 528/100; 524/101; 524/127

(58) Field of Classification Search
USPC ......................... 524/100, 101, 127
See application file for complete search history.

(56) References Cited

U.S. PATENT DOCUMENTS

| | | | |
|---|---|---|---|
| 3,595,942 A | 7/1971 | Wald et al. | |
| 3,810,850 A | 5/1974 | Rowton | |
| 4,542,170 A | 9/1985 | Hall et al. | |
| 4,599,365 A | 7/1986 | Gagliani et al. | |
| 5,153,245 A | 10/1992 | Cipolli et al. | |
| 5,418,290 A | 5/1995 | Machida et al. | |
| 5,663,280 A | 9/1997 | Ogoe et al. | |
| 6,716,899 B1 | 4/2004 | Klatt et al. | |
| 7,417,083 B2 | 8/2008 | Kosaka et al. | |
| 7,449,577 B2 | 11/2008 | Kimura et al. | |
| 7,465,761 B2 | 12/2008 | Murase et al. | |
| 8,017,676 B2 * | 9/2011 | Kim et al. ..................... 524/100 |
| 2008/0090075 A1 | 4/2008 | Kondo et al. | |

FOREIGN PATENT DOCUMENTS

| | | |
|---|---|---|
| CN | 101108914 | 1/2008 |
| CN | 101225224 | 7/2008 |
| EP | 1705225 A1 | 9/2006 |
| JP | 2002060596 | 2/2002 |
| JP | 2004091679 | 3/2004 |
| WO | 9220731 A1 | 11/1992 |
| WO | 2006092974 A1 | 9/2006 |
| WO | 2008011941 A1 | 1/2008 |
| WO | 2009047353 A1 | 4/2009 |
| WO | 2010012126 | 2/2010 |
| WO | 2010012136 A1 | 2/2010 |

* cited by examiner

*Primary Examiner* — Terressa Boykin
(74) *Attorney, Agent, or Firm* — Whyte Hirschboeck Dudek S.C.

(57) ABSTRACT

Halogen-free, flame-retardant thermoplastic polyester elastomer (TPE-E) compositions that include at least one thermoplastic polyester elastomer, at least one low-melting, phosphorus-based flame retardant having a melting temperature no higher than 150° C., and a blend of solid intumescent flame retardants comprising a phosphorus-based, organic salt flame retardant and a nitrogen-based organic flame retardant are provided. The presence of the low-melting, phosphorus-based flame retardant renders the compositions more resistant to scratch-whitening.

9 Claims, No Drawings

FLAME RETARDANT THERMOPLASTIC ELASTOMER COMPOSITION WITH RESISTANCE TO SCRATCH-WHITENING

BACKGROUND

Intumescent flame retardants have been widely used in thermoplastic polyester elastomers to provide superior flame retardant properties, mechanical properties, and thermal stability. However, although intumescent flame retardants can enable thermoplastic polyester elastomers to pass stringent flame retardance test, such as the VW-1 test used by the cable industry, they typically have relatively poor compatibility with thermoplastic polyester elastomers, and the final compounds and articles made therefrom are easily scratched and exhibit poor scratch-whitening resistance.

SUMMARY

One aspect of the invention provides halogen-free, flame-retardant compositions. These compositions comprise a thermoplastic polyester elastomer, a low-melting, phosphorus-based flame retardant having a melting temperature no higher than 150° C. and a blend of solid intumescent flame retardants comprising a phosphorus-based, organic salt flame retardant and a nitrogen-based organic flame retardant. The compositions are characterized in that a cable consisting of the halogen-free, flame-retardant composition has a higher resistance to scratch-whitening than a cable consisting of a comparative composition that differs from the halogen-free, flame-retardant composition only in that the comparative composition does not include a low-melting, phosphorus-based flame retardant; the total weight percent of the solid intumescent flame retardants in the comparative composition being equal to the total weight percent of the low-melting, phosphorus-based flame retardant and the solid intumescent flame retardants in the halogen-free, flame-retardant composition.

In some embodiments, the low-melting, phosphorus-based flame retardant is an organic phosphate ester, such as bisphenol A diphosphate. In some such embodiments, the nitrogen-based organic flame retardant is a melamine derivative. In some such embodiments, the compositions further comprise a styrenic thermoplastic copolymer.

In some embodiments, the halogen-free, flame-retardant compositions comprise 30 to 90 weight percent thermoplastic polyester elastomer, 5 to 30 weight percent low-melting, phosphorus-based flame-retardant, 10 to 70 weight percent phosphorus-based, organic salt flame retardant; and 5 to 50 weight percent nitrogen-based organic flame retardant, based on the total weight of the composition.

In some embodiments, the halogen-free, flame-retardant compositions comprise 50 to 90 weight percent thermoplastic polyester elastomer, 5 to 25 weight percent low-melting, phosphorus-based flame-retardant, 10 to 50 weight percent phosphorus-based, organic salt flame retardant, and 5 to 35 weight percent nitrogen-based organic flame retardant, based on the total weight of the composition.

Another aspect of the invention provides a wire or cable comprising a jacketing layer or an insulating layer comprising a halogen-free, flame-retardant composition in accordance with this invention.

DETAILED DESCRIPTION OF THE PREFERRED EMBODIMENT

One aspect of the invention provides halogen-free, flame-retardant thermoplastic polyester elastomer (TPE-E) compositions that include at least one thermoplastic polyester elastomer, at least one low-melting, phosphorus-based flame retardant having a melting point of no greater than 150° C. and a blend of solid intumescent flame retardants. The blend comprises at least one phosphorus-based organic salt flame retardant and at least one nitrogen-based organic flame retardant. The presence of the low-melting, phosphorus-based flame retardant renders the composition more resistant to scratch-whitening. The compositions are characterized by good flame-retardant and mechanical properties, which render them suitable for use in a wide variety of articles, including jacketing and insulation for cables and/or wires.

"Halogen-free" and like terms mean that the compositions are without or substantially without halogen content, i.e., contain less than 2000 mg/kg of halogen as measured by ion chromatography (IC) or a similar analytical method. Halogen content of less than this amount is considered inconsequential to the efficacy of the blend as, for example, a wire or cable covering.

Without intending to be bound to any particular theory of the invention, the inventors believe the low-melting, phosphorus-based flame retardant acts as a plasticizer in the composition, as well as a flame retardant, and improves the compatibility between the thermoplastic polyester elastomer polymer and the intumescent flame retardants.

Thermoplastic Polyester Elastomers:

A "thermoplastic elastomer" (TPE) is a materials that has the properties of an elastomer but can be processed like a thermoplastic. TPEs are generally made by special block copolymerisation or graft polymerization or blending of two polymers. In each case the thermoplastic elastomer contains at least two segments, one of which is thermoplastic and the other elastomeric. Thermoplastic polyester elastomers (TPE-Es) are a class of TPE. These are block copolymers of alternating hard and soft segments connected by ester or ether linkages. Examples of commercially available TPE-Es include Arnitel® from DSM, Kytrel® from DuPont, and Riteflex® from Ticona.

TPE-Es forms a continuous polymer phase in the present compositions. In some embodiments, additional polymers may be present in the compositions. These additional polymers can be dispersed in, or co-continuous with, the TPE-E. The compositions typically contain an amount of 30 to 90 weight percent (wt. %) polymer phase (i.e., TPE-E plus any additional polymers), based on the total weight of the composition. This includes compositions that contain 50 to 90 wt. % polymer phase, based on the total weight of the composition, and also includes compositions that contain 30 to 40 wt. % polymer phase, based on the total weight of the composition. If additional polymers are present, the TPE-E typically makes up at least 50 wt. % of the polymer phase (e.g., at least 60 wt. % or at least 70 wt. %).

Other Polymers:

The present compositions can optionally include one or more additional polymers, including other TPEs, such as styrenic block copolymers. These can be dispersed in, or co-continuous with, the continuous TPE-E resin phase of the composition.

In some embodiments, the compositions provided herein comprise at least one styrenic block copolymer. Generally speaking, styrenic block copolymers include at least two monoalkenyl arene blocks, preferably two polystyrene blocks, separated by a block of a saturated conjugated diene, such as a saturated polybutadiene block. Suitable unsaturated block copolymers include, but are not limited to, those represented by the following formulas: A-B-R(-B-A)$_n$ or A$_x$-(BA-)$_y$-BA wherein each A is a polymer block comprising a vinyl aromatic monomer, such as styrene, and each B is a polymer block comprising a conjugated diene, such as isoprene or butadiene, and optionally a vinyl aromatic monomer, such as styrene; R is the remnant of a multifunctional coupling agent (if R is present, the block copolymer can be a star or branched block copolymer); n is an integer from 1 to 5; x is zero or 1; and y is a real number from zero to 4.

Methods for the preparation of such block copolymers are known in the art. See, e.g., U.S. Pat. No. 5,418,290. Suitable catalysts for the preparation of useful block copolymers with unsaturated rubber monomer units include lithium based catalysts and especially lithium-alkyls. U.S. Pat. No. 3,595, 942 describes suitable methods for hydrogenation of block copolymers with unsaturated rubber monomer units to from block copolymers with saturated rubber monomer units.

Suitable block copolymers having unsaturated rubber monomer units include, but are not limited to, styrene-butadiene (SB), styrene-ethylene/butadiene (SEB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene.

Block copolymers with unsaturated rubber monomer units can comprise homopolymers of butadiene or isoprene or they can comprise copolymers of one or both of these two dienes with a minor amount of styrenic monomer. In some embodiments, the block copolymers are derived from (i) a $C_{3-20}$ olefin substituted with an alkyl or aryl group (e.g., 4-methyl-1-pentene and styrene) and (ii) a diene (e.g. butadiene, 1,5-hexadiene, 1,7-octadiene and 1,9-decadiene). A non-limiting example of such olefin copolymer includes styrene-butadiene-styrene (SBS) block copolymer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Suitable block copolymers include, but are not limited to, those commercially available, such as, KRATON™ supplied by KRATON Polymers LLC in Houston, Tex.

If present, the styrenic block copolymers are typically present in an amount of 0.1 to 50 wt. %, based on the total weight of the TPE-E and the styrenic block copolymer. This includes compositions that contain 20 to 40 wt. % styrenic block copolymer, based on the total weight of the TPE-E and the styrenic block copolymer.

Low-Melting, Phosphorus-Based Flame Retardants:

The phosphorus-based flame retardants that enhance the scratch-whitening resistance of the present compositions are liquids at melt processing conditions and may be liquids at room temperature (23° C.). Thus, the low-melting, phosphorus-based flame retardants have a melting point no higher than 150° C. Examples include low-melting phosphate esters or phosphazene derivatives. Phosphate esters include aromatic and aliphatic phosphate esters and their polymers. Examples of aliphatic phosphate ester flame retardants include trimethyl phosphate, tributyl phosphate, tri(2-ethylhexyl) phosphate, tributoxyethyl phosphate, monoisodecyl phosphate and 2-acryloyloxyethylacid phosphate. Examples of aromatic phosphate esters include trixylenyl phosphate, tris(phenylphenyl) phosphate, trinaphthyl phosphate, cresyldiphenyl phosphate, xylenyldiphenyl phosphate and dipheny-2-methacryloyloxyethyl phosphate. Examples of aromatic bis(phosphate esters) include resorcinol bis(diphenyl phosphate), resorcinol bis(dixylenyl phosphate), resorcinol bis(dicresylphosphate), hydroquinone bis(dixylenyl phosphate), bisphenol-A bis(diphenyl phosphate) and tetrakis (2,6-dimethylphenyl) 1,3-phenylene bisphosphate.

The low-melting, phosphorus-based flame retardants are typically present in an amount of 5 to 30 wt. %, based on the total weight of the composition. This includes compositions that contain 5 to 25 wt. % low-melting, phosphorus-based flame retardants, based on the total weight of the composition, and further includes compositions that contain 10 to 20 wt. % low-melting, phosphorus-based flame retardants, based on the total weight of the composition.

Intumescent Flame Retardants:

The present compositions include a blend of at least two solid (at room temperature) intumescent flame retardants, one of which is a phosphorus-based, organic salt, such as a phosphoric acid salt or a phosphinic acid salt, and the other of which is a nitrogen-based organic flame retardant. An "intumescent flame retardant" is a flame retardant that yields a foamed char formed on a surface of a polymeric material during fire exposure.

Phosphoric acid salts include phosphates, pyrophosphates, metaphosphates and polyphosphates. For example, the phosphoric acid salt can be selected from the group consisting of melamine phosphate, melamine pyrophosphate, melamine orthophosphate, monoammonium phosphate, diammonium phosphate, ammonium pyrophosphate, phosphoric acid amide, melamine polyphosphate, ammonium polyphosphate, piperazine polyphosphate, polyphosphoric acid amide and combinations of two or more of the foregoing phosphoric acid salts.

Phosphinic acid salts include salts of phosphinic acid and salts of diphosphinic acid and polymeric derivatives thereof. Examples of phosphinic acid salt flame retardants include aluminum diethylphosphinate and aluminum methylethylphosphinate.

Nitrogen-based organic flame retardants include halogen-free, flame-retardant nitrogen-containing heterocyclic compounds, such as melamine and melamine derivatives. These include melamine and methylol melamine; cyanuric acid, isocyanuric acid and their derivatives such as cyanuric acid, methyl cyanurate, diethyl cyanurate, trimethyl cyanurate, triethyl cyanurate, isocyanuric acid, N,N'-diethyl isocyanurate, tris(methyl) isocyanurate, tris(ethyl) isocyanurate, bis(2-carboxylethyl) isocyanurate, 1,3,5-tris(2-carboxyethyl) isocyanurate and tris(2,3-epoxypropyl) isocyanurate; salts of melamine (derivatives) such as melamine isocyanurate, and (iso) cyanuric acid (derivatives); tetrazole compounds including tetrazole amine salts such as tetrazole guanidine salts, tetrazole piperazine salts and tetrazole ammonium salts, and tetrazole metal salts such as tetrazole sodium salts and tetrazole manganese salts, e.g., 5,5'-bistetrazole diguanidine salt, 5,5'-bistetrazole diammonium salt, 5,5'-bistetrazole diaminoguanidine salt and 5,5'-bistetrazole piperazine salt.

The intumescent flame retardants are typically present in an amount of 10 to 70 wt. %, based on the total weight of the composition. This includes compositions that contain 20 to 60 wt. %, intumescent flame retardants, based on the total weight of the composition, and further includes compositions that contain 30 to 50 wt. %, intumescent flame retardants, based on the total weight of the composition. Typically, the phosphorus-based, organic salt comprises at least about 50 wt. % of the total intumescent flame retardant. This includes compositions in which the phosphorus-based salt comprises at least about 60 wt. % of the intumescent flame retardant, and further includes compositions in which the phosphorus-based salt comprises at least about 70 wt. % of the intumescent flame retardant.

Optional Additives and Fillers:

The compositions of this invention can, optionally, also contain additives and/or fillers. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used in a conventional manner and in conventional amounts, e.g., from 0.01 wt. % or less to 10 wt. % or more, based on the total weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorillonite; huntite; celite; asbestos; ground minerals; and lithopone. These fillers are typically used a conventional manner and in conventional amounts, e.g., from 5 wt. % or less to 50 wt. % or more based on the weight of the composition.

Suitable UV light stabilizers include hindered amine light stabilizers (HALS) and UV light absorber (UVA) additives.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Scratch-Whitening Resistance:

When a polymeric surface is scratched, voids can form or increase. Light scattered from these voids can make the scratch visible and appear white, particularly on a darker surface. The present inventors have discovered that by adding low-melting, phosphorus-based flame retardants to a TPE-E composition that includes solid intumescent flame-retardants, the scratch-whitening resistance of the composition can be dramatically improved. Thus, the present compositions are characterized in that cables made from the compositions have a higher resistance to scratch-whitening than cables made from a comparative composition that differs from the inventive composition only in that the comparative composition does not include the low-melting, phosphorus-based flame retardants; the total weight percent of the intumescent flame retardants in the comparative composition being equal to the total weight percent of the intumescent flame retardants and the low-melting, phosphorus-based flame retardants in the inventive composition and the ratio of the phosphorus-based, organic salt flame retardant to the nitrogen-based organic flame retardant being the same in the inventive and comparative compositions.

The example below provides one method of evaluating the flame retardance of a cable made from the inventive and comparative compositions. In some embodiments, the compositions show no evidence of scratch-whitening, based upon these methods.

Composition Properties:

The compositions can be characterized by their resistance to scratch-whitening, as well as their good mechanical and flame-retardant properties.

Flame Retardance:

Wires coated with the compositions pass the UL-44 VW-1 flame rating for an insulated wire. "VW-1" is an Underwriters' Laboratory (UL) flame rating for wire and sleeving. It denotes "Vertical Wire, Class 1", which is the highest flame rating a wire or sleeve can be given under the UL 44 specification. The test is performed by placing the wire or sleeve in a vertical position. A flame is set underneath it for a period of time, and then removed. The characteristics of the sleeve are then noted. The VW-1 flame test is determined in accordance with method 1080 of UL-1581.

Tensile Strength and Elongation at Break:

The present compositions can be characterized by their tensile strength at break (in MPa) and elongation at break (%). Tensile strength and elongation can be measured in accordance with the ASTM D-638 testing procedure on compression molded samples prepared according to ASTM D4703. Elongation at break, or elongation to break, is the strain on a sample when it breaks. It usually is expressed as a percent.

Some embodiments of the present compositions have tensile strengths at break of at least 8 MPa. This includes compositions having tensile strength at break of at least 8.5 MPa and further includes compositions having a tensile strength at break of at least 9 MPa.

Some embodiments of the present compositions have an elongation at break of at least 200%. This includes compositions having an elongation at break of at least 250%, and further includes compositions having an elongation at break of at least 270%.

Melt Flow Rates:

Melt Flow Rate (MFR) is measured according to ASTM D 1238-04, Procedure C, Condition 190° C./2.16 kg. Some embodiments of the compositions have an MFR of at least 4 g/10 min. This includes compositions having an MFR of at least 5 g/10 min. and further includes compositions having an MFR of at least 6 g/10 min.

Compounding:

The compositions can be formed by mixing the TPE-E, any additional polymers, the solid intumescent flame retardants, the low-melting, phosphorus-based flame retardants and any additional additives and fillers. The mixing can take place in a step-wise fashion or in a single step and can be carried out in a conventional tumbling device.

Compounding of the compositions can be effected by standard compounding equipment. Examples of compounding equipment are internal batch mixers, such as a Banbury™ or Bolling™ internal mixer or a Brabender™ mixer. Alternatively, continuous single, or twin screw, mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness. The resulting compositions are desirably capable of being molded and shaped into an article, such as a wire jacket, profile, sheet or pellet for further processing.

Articles:

Another aspect of the invention provides articles, such as molded or extruded articles, comprising one or more compositions of the present invention.

Articles include wire and cable jackets and insulation. Thus, in some embodiments, the article includes a metal conductor and a coating on the metal conductor to provide an "insulated" wire capable of electrical transmission. A "metal conductor," as used herein, is at least one metal component used to transmit either electrical power and/or electrical signals. Flexibility of wire and cables is often desired, so the metal conductor can have either a solid cross-section or can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to as cable "jacketing". For some cables, the sheathing is only a polymeric jacketing layer surrounding a cable core. There are also some cables having a single layer of polymer surrounding the conductors, performing both the roles of insulation and jacketing. The present compositions may be used as, or in, the polymeric components in a full range of wire and cable products, including power cables and both metallic and fiber optic communication applications. A cable containing an insulation layer comprising a composition of this invention can be prepared with various types of extruders, e.g., single or twin screw types.

The following examples illustrate various embodiments of this invention. All parts and percentages are by weight unless otherwise indicated.

EXAMPLE

The following examples illustrate embodiments of methods for making thermoplastic elastomer compositions in accordance with the present invention.

Methods:

A laboratory Brabender mixer (lobed batch type) is used for compounding samples (details for the raw materials are shown in Table 1). The laboratory batch mixer is preheated to 190° C. prior to mixing.

Thermoplastic polyester elastomers and other thermoplastic compounds are added into the mixer at rotor speed of 10 rpm. At the same time a portion of the solid intumescent flame retardants is gradually added into the mixing bowl. After these materials melt, fluxing of the resins results in ongoing incorporation of the intumescent flame retardants into the melt, and the remaining solid intumescent flame retardants are gradually spooned into the mixer to maintain mixer fill until all of the intumescent flame retardant powder is incorporated into the melt. Then Irganox 1010 and Irgafos 168 additives are added. A liquid polyphosphate flame retardant is then added in about 5 equal increments by syringe until the liquid is incorporated into the melt before adding more.

After all raw materials are fed into the melt, the rotor speed is increased to 40 rpm and the batch is kept mixing until the melt thermocouple in the mixing bowl reached 200° C.

To facilitate the removal of the sticky melt batch, the mixer temperature is reset to 125° C. and rotor speed is reduced to 5 rpm to allow the batch to cool down. The batch solidifies as it is cooled and is ground to a course granulate by the mixer rotors. The batch is then removed by the disassembly and removal of the mixer body.

The resulting material is run through a granulator to provide a fine granulate, and homogenized by dry blending.

Compression molded plaques are prepared at 200° C. in a hot presser, using a low pressure cycle to facilitate melting, and then a high pressure to shape granulates to 3×200×200 mm plaques (0.075"×8.0"×8.0"). After compressing, the plaques are cooled down to room temperature. ASTM D-638 Type IV tensile testing bars are cut from the plaques using a dog-bone cutter in an arbor press.

TABLE 1

| Grade name | Description | Properties | Suppliers |
| --- | --- | --- | --- |
| Hytrel G4074 | thermoplastic polyester elastomer (TPE-E) | Shore D 40, MFR 5.2 g/10 min (@190° C., 2.16 kg) | Dupont |
| G1651 | SEBS | Shore A 60, styrene content 33% | Kraton |
| Exolit AP766 | ammonium pyrophosphate (APP) | white powder | Clariant |
| Melagard MC | melamine cyanurate (MC) | white powder, particle size 15 μm | Italmatch |
| Supresta BAPP | bisphenol A diphosphate | liquid | Supresta |
| FP2100J | P-N intumescent Flame Retardant | white powder | Adeka |
| Exolit OP1230 | phosphinic metal salt | particle size D50 25-50 μm | Clariant |
| Algoflon DF 210 | styrene acrylonitrile encapsulated polytetraflouroethylene | particle size 550 μm | Solvay |
| Irgafos 168 | antioxidant | — | Ciba |
| Irganox 1010 | antioxidant | — | Ciba |

Characterization:
Tensile Properties.

The tensile strength at break and the elongation at break are measured according to ASTM D-638 at room temperature on an INSTRON 5565 Tensile Tester by increasing the crosshead speed (@ 12 seconds) to 500 mm/min.

Flame Retardant Properties.

A Brabender lab extruder with a wire crosshead is used to fabricate samples of insulated 18AWG stranded wire. A ramped barrel temperature, 190/190/200/200° C., is used with a polyethylene metering screw. A 0.085" finish diameter over a nominal 0.047" conductor diameter is prepared. The extruder speed (about 20 rpm) is maintained at a 4.6 m/minute wiring coating speed at the target geometry. Extruder drive amps and head pressures are measured at this constant output condition for extrusion comparison of the various compositions.

The burn performance of the insulated wires is tested using the UL-44 VW-1 test. Mimic VW-1 testing is conducted in a UL-94 chamber. The test specimens have dimensions of 200*2.7*1.9 mm. The specimen is hanged on a clamp, with its longitudinal axis vertical by applying a 50 g load on to its lower end. A paper flag (2*0.5 cm) is placed on the top of the wire. The distance between the flame bottom (highest point of the burner oracle) and the bottom of flag is 18 cm. The flame is applied continuously for 45 sec. After flame time (AFT), uncharred wire length (UCL) and uncharred flag area percentage (flag uncharred) are recorded during and after combustion. Four or five specimen are tested for each sample. Any of the following phenomena will result in a rating of "not pass": (1) the cotton under the specimen is ignited; (2) the flag is burned out; or (3) dripping with flame is observed.

Scratch-Whitening Resistance.

Scratch whitening tests are carried out on extruded wires. Carbon black master batches are fed into a single screw extruder together with the formulated compositions. The black wire is tied into a loose slip knot and pulled manually with high force to simulate wires scratching each other. The surface is inspected visually to check if the wire shows any signs of scratch-whitening. An improvement in scratch-whitening resistance can be indicated by fewer and/or lighter white-colored defects on the surface.

Results:

Formulations and properties of the examples are shown in Table 2. As shown in the table, inventive examples (1E) 1-3 comprise liquid bisphenol A diphosphate (BAPP) together with the following intumescent flame retardant packages: (1) ammonium pyrophosphate (APP) plus melamine cyanurate (MC); (2) proprietary formulated flame retardant from Adeka (FP2100J, which includes a phosphorus-based salt and a melamine derivative); and (3) a metal salt of phosphinic acid plus MC, respectively. The comparative examples (CE) comprise an intumescent flame retardant package without the BAPP. All cables for the comparative examples show poor scratch resistance performance. In contrast, for the inventive examples which include the low-melting phosphates, the scratch resistance is significantly improved without degrading the mechanical properties and flame retardant performance. In addition, all inventive examples have a higher MFR than their corresponding comparative examples, which indicates better processability.

TABLE 2

| Components | CE 1 | IE 1 | CE 2 | IE 2 | CE 3 | IE 3 |
|---|---|---|---|---|---|---|
| Formulations (wt. %) | | | | | | |
| Hytrel G4074 | 35 | 35 | 35 | 35 | 35 | 35 |
| G1651 | 15 | 15 | 15 | 15 | 15 | 15 |
| Exolit AP766 | 35 | 28 | | | | |
| Melagard MC | 15 | 12 | | | 20 | 16 |
| Supresta BAPP | | 10 | | 10 | | 10 |
| FP2100J | | | 50 | 40 | | |
| Exolit OP1230 | | | | | 30 | 24 |
| Algoflon DF 210 | 0.1 | 0.1 | 0.1 | 0.1 | 0.1 | 0.1 |
| Irgaphos 168 | 0.1 | 0.1 | 0.1 | 0.1 | 0.1 | 0.1 |
| Irganox 1010 | 0.3 | 0.3 | 0.3 | 0.3 | 0.3 | 0.3 |
| Properties | | | | | | |
| Tensile strength (MPa) | 9.1 | 9.5 | 9.4 | 9.3 | 8.7 | 8.9 |
| Tensile elongation (%) | 236 | 272 | 241 | 279 | 226 | 251 |
| Mimic VW-1 passing ratio (pass/total) | 4/5 | 4/5 | 5/5 | 5/5 | 5/5 | 5/5 |
| Scratch whitening | yes | no | yes | no | yes | no |
| MFR (190° C., 2.16 kg) | 3.5 | 5.1 | 3.8 | 4.9 | 6.1 | 6.6 |

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometallic compounds.

The term "or", unless stated otherwise, refers to the listed members individually as well as in any combination.

Although the invention has been described in considerable detail through the preceding description, drawings and examples, this detail is for the purpose of illustration. One skilled in the art can make many variations and modifications without departing from the spirit and scope of the invention as described in the appended claims.

The invention claimed is:

1. A halogen-free, flame-retardant composition comprising:
   a thermoplastic polyester elastomer comprising alternating hard and soft blocks connected by ester or ether linkages;
   a low-melting, phosphorus-based flame retardant having a melting temperature no higher than 150° C.; and
   a blend of solid intumescent flame retardants comprising a phosphorus-based, organic salt flame retardant and a nitrogen-based organic flame retardant;
   the composition characterized in that a cable consisting of the halogen-free, flame-retardant composition has a higher resistance to scratch-whitening than a cable consisting of a comparative composition that differs from the halogen-free, flame-retardant composition only in that the comparative composition does not include a low-melting, phosphorus-based flame retardant; the total weight percent of the solid intumescent flame retardants in the comparative composition being equal to the total weight percent of the low-melting, phosphorus-based flame retardant and the solid intumescent flame retardants in the halogen-free, flame-retardant composition.

2. The halogen-free, flame-retardant composition of claim 1, in which the low-melting, phosphorus-based flame retardant is an organic phosphate ester.

3. The halogen-free, flame-retardant composition of claim 2, in which the low-melting organic phosphate ester is bisphenol A diphosphate.

4. The halogen-free, flame-retardant composition of claim 3, wherein the nitrogen-based organic flame retardant is a melamine derivative.

5. The halogen-free, flame-retardant composition of claim 3, further comprising a styrenic thermoplastic copolymer.

6. The halogen-free, flame-retardant composition of claim 1, comprising:
   30 to 90 weight percent thermoplastic polyester elastomer;
   5 to 30 weight percent low-melting, phosphorus-based flame-retardant;
   10 to 70 weight percent phosphorus-based, organic salt flame retardant; and
   5 to 50 weight percent nitrogen-based organic flame retardant, based on the total weight of the composition such that the total sum of the content in percentage of each component of the composition is equal to or less than 100%.

7. The halogen-free, flame-retardant composition of claim 1, comprising:
   50 to 90 weight percent thermoplastic polyester elastomer;
   5 to 25 weight percent low-melting, phosphorus-based flame-retardant;
   10 to 50 weight percent phosphorus-based, organic salt flame retardant;
   5 to 35 weight percent nitrogen-based organic flame retardant, based on the total weight of the composition such that the total sum of the content in percentage of each component of the composition is equal to or less than 100%.

8. A wire or cable comprising a jacketing layer or an insulating layer comprising the halogen-free, flame-retardant composition of claim 1.

9. The halogen-free, flame-retardant composition of claim 1, wherein the low-melting, phosphorus-based flame retardant is liquid at 23° C.

* * * * *